United States Patent [19]

Hattori

[11] 4,122,818
[45] Oct. 31, 1978

[54] OIL CIRCULATING AND COOLING SYSTEM

[75] Inventor: Kyo Hattori, Toyota, Japan

[73] Assignee: Toyota Jidosha Kogyo Kabushiki Kaisha, Aichi, Japan

[21] Appl. No.: 685,497

[22] Filed: May 12, 1976

[30] Foreign Application Priority Data

Nov. 11, 1975 [JP] Japan .................................. 50-136063
Dec. 22, 1975 [JP] Japan .................................. 50-157454

[51] Int. Cl.² .............................................. F01M 1/00
[52] U.S. Cl. ........................ 123/196 AB; 123/196 M; 184/6.5
[58] Field of Search ................. 184/6.5; 123/196 AB, 123/196 M, 196 R

[56] References Cited

U.S. PATENT DOCUMENTS 3,942,503  3/1976  Hanaoka ...................... 123/196 AB

FOREIGN PATENT DOCUMENTS 1,476,088  10/1965  Fed. Rep. of Germany .... 123/196 AB
723,197  9/1931  France ............................... 123/196 AB Primary Examiner—Ronald H. Lazarus
Attorney, Agent, or Firm—Koda and Androlia

[57] ABSTRACT

An oil circulating and cooling system for an internal combustion engine having an oil pump to pump the oil under pressure throughout the oil distribution system of the internal combustion engine and an oil pressure regulation circuit in parallel with the oil distribution system of the internal combustion engine. The oil pressure regulation circuit comprises a relief valve for diverting a portion of the oil from the oil pump to the oil pressure regulation circuit thereby setting the maximum value of the oil pressure throughout the oil distribution system of the internal combustion engine and an oil cooler for cooling the oil which has been diverted to the oil pressure regulation circuit. Since the oil temperature and oil pressure at the output of the oil pump increase with increased engine rpm, the oil is only cooled when the engine rpm is high.

7 Claims, 7 Drawing Figures

OIL CIRCULATING AND COOLING SYSTEM

FIELD OF INVENTION

This invention relates to engine oil circulating systems and in particular to engine oil circulating systems provided with an engine oil cooler.

DESCRIPTION OF THE PRIOR ART

In recent years, because of the development of high speed and high performance engines and anti-polution policies, there has been a tendency for the temperature of the oil in the engine to rise. From the point of view of engine reliability, this rise in engine oil creates the need to lower the temperature of the engine oil. For this reason various oil cooling devices have traditionally been employed in oil circulating systems. These, however, have all been positioned in line with the oil pump and in series with the oil distribution system of the engine. That is as shown in FIG. 1, the engine oil 2 contained in oil pan 1 is drawn into oil pump 4 through line 3. The oil 2 then flows out of oil pump 5 under pressure to oil cooling unit 6 and by means of line 7 throughout the oil distribution system of the engine.

The output of oil pump 4 to oil cooling unit 6 is divided thereby providing forked line 8. Forked line 8 is connected to the input port of a relief valve 9A which substantially comprises oil pressure regulation circuit 9. Furthermore, the output port of relief valve 9A is drained through line 10 back to oil pan 1. Since the oil in a oil circulating system of this kind continually flows through the oil cooler, there is a danger that the engine oil will over cool at low engine rpm's when the temperature does not rise significantly. Furthermore, by putting the oil cooler unit in series with the engine there is a loss of oil pressure. The loss in oil pressure can be compensated for by providing a high capacity oil pump but such an oil pump will increase manufacturing costs.

It is also possible to build a supplemental circuit for cooling the oil which incorporates an independent oil pump and oil cooling unit apart from the main engine oil circulating system. Unfortunately, this has the disadvantage of complexity and high cost.

SUMMARY OF THE INVENTION

Accordingly, it is a general object to the present invention to provide an oil circulating and cooling system for an internal combustion engine which does not over-cool the engine oil at low engine rpm.

It is yet another object of the present invention to provide an oil circulating and cooling system for an internal combustion engine which does not require special parts.

It is still another object of the present invention to provide an oil circulating and cooling system for an internal combustion engine which is relatively simple and low in cost.

It is another object of the present invention to provide an oil cooling and circulating system for an internal combustion engine which does not require a separate oil cooling unit.

In keeping with the principles of the present invention, the objects are accomplished in an oil circulating and cooling system for an internal combustion engine comprising an oil pump to pump the oil under pressure through the oil distribution system of the engine and an oil pressure regulation circuit in parallel with the oil distribution system of the engine for preventing the oil pressure in the oil distribution of the internal combustion engine from exceeding some predetermined value. The oil pressure regulation circuit comprises a relief valve for directing a portion of the oil from the oil pump to the oil pressure regulation circuit thereby setting the maximum valve of the oil pressure in the internal combustion engine and an oil cooler for cooling the oil which is diverted through the oil pressure regulation circuit. Since oil temperature in the engine and oil pressure at the output of the oil pump increases with increased engine rpm, oil is diverted from the oil pump to the oil pressure regulation circuit wherein it is cooled by the oil cooler. Accordingly, the engine oil is only cooled when the engine rpm and temperature are high thereby preventing over-cooling of the oil at lower engine rpm's and lower engine temperatures.

In particular the oil pump is provided on the front of the engine and the relief valve is provided in the oil pump such that the diverted oil is expelled through a hole in the oil pump onto the timing chain where it is cooled as the timing chain revolves.

BRIEF DESCRIPTION OF THE DRAWINGS

The above mentioned and other features and objects of the present invention will become more apparent by reference to the following description taken in conjunction with the accompanying, wherein like reference numerals denote like elements and in which.

DESCRIPTION OF THE PREFERRED EMBODIMENT

Figure 1:
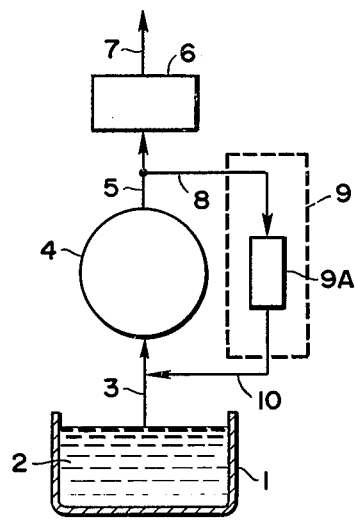
FIG. 1 is a circuit diagram showing an oil circulating and cooling system of the prior art.
Figure 2:
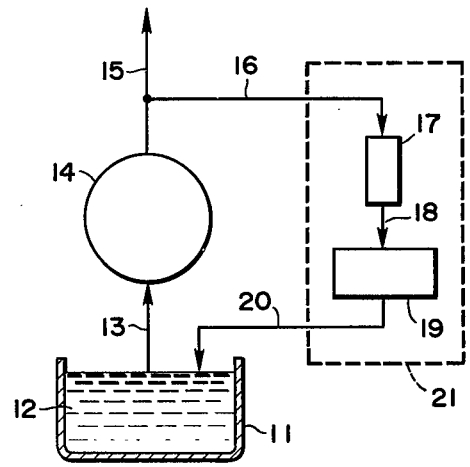
FIG. 2 is a circuit diagram showing a basic oil circulating and cooling system in accordance with the teachings of the present invention.
Figure 3:
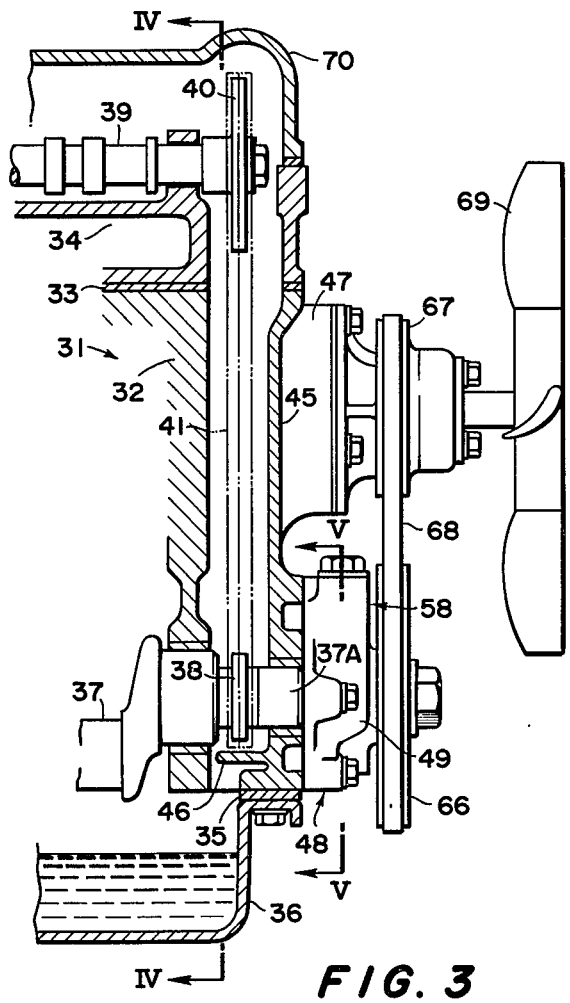
FIG. 3 is a cross sectional view illustrating a specific embodiment of an oil circulating and cooling system in accordance with the teachings of the present invention.
Figure 4:
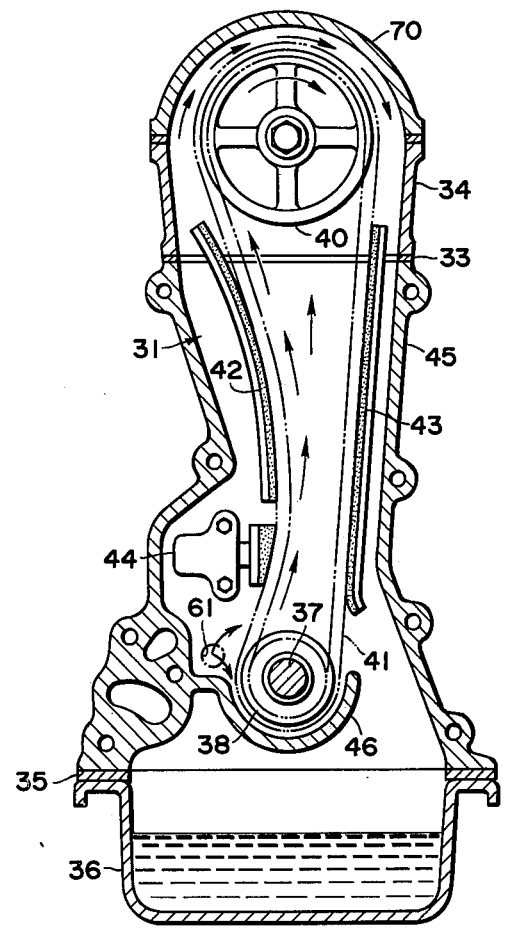
FIG. 4 is a cross sectional view along the lines IV—IV in FIG. 3.
Figure 5:
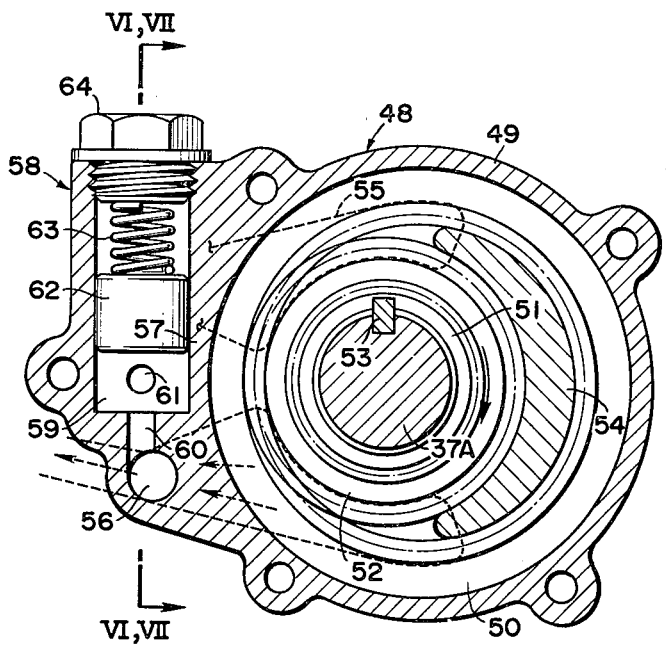
FIG. 5 is a enlarged cross sectional view along the lines V — V in FIG. 3.
Figure 6:
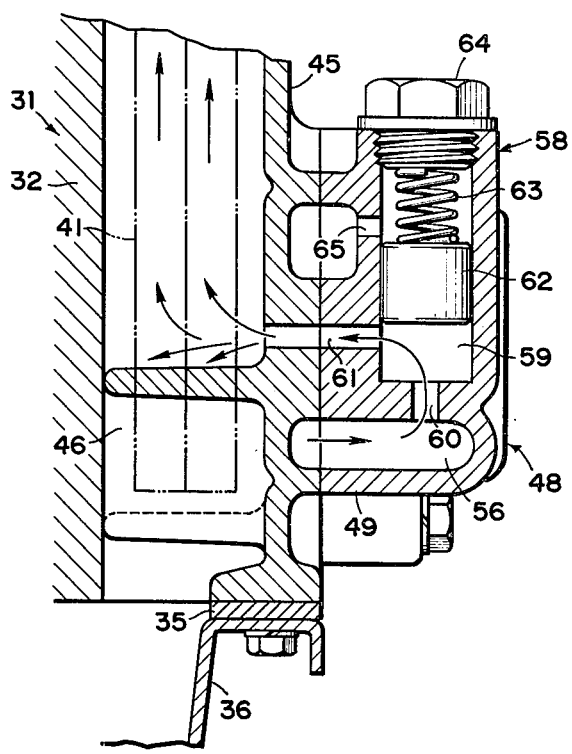
FIG. 6 is a cross sectional view along the lines VI — VI in FIG. 5.

Referring more specifically to the drawings in FIG. 2 the engine oil 12 is contained in oil pan 11. One end of line 13 is inserted into oil 12 in oil pan 11 and the other end is connected to the input of oil pump 14 which is driven by the engine (not shown). The output of oil pump 14 is connected to line 15 which distributes the oil 12 to the oil distribution system of the engine. Furthermore, the output of oil pump 14 is also connected to the input port of relief valve 17 via line 16. The output of relief valve 17 is connected to the input of oil cooler 19 via line 18 and the output of oil cooler 19 returns the oil 12 to oil pan 11 via line 20.

The above mentioned oil cooler 19 is typically mounted at the front of the engine near the radiator in a relatively low temperature area whereby the engine oil maybe cooled.

In operation when the engine rpm is low, the output pressure of oil pump 14 is likewise low. Accordingly, so long as the output pressure of oil pump 14 is below some predetermined threshold value of relief valve 17, relief valve 17 remains closed if oil 12 does not flow through the oil cooler 19 and the oil 12 is not cooled. It should be noted that when engine rpm is low, the engine temperature and temperature of the oil are typically low and there is no requirement that the oil be cooled.

In contrast, when engine rpm is high, the output pressure of oil pump 14 increases until it reaches the threshold value of relief valve 17. When the output pressure of oil pump 14 exceeds the threshold pressure of relief valve 17, relief valve 17 opens thereby diverting a portion of the engine oil 12 to the oil pressure regulating circuit 21. The diverted oil 12 passes through oil cooler 19 and is returned to oil pan 11. As the diverted oil passes through oil cooler 19 the temperature of the oil 12 is reduced thereby preventing the temperature of the oil 12 in the total system from increasing. Since the loss of oil in the main oil distribution circuit of the engine is not due to the oil cooler 19 and is only a natural result of the operation of relief valve 17, a oil pump 14 of increased capacity is not required.

As pointed out above, the oil circulation and cooling system of the present invention has an oil cooler in the oil pressure regulating circuit 21 which is in parallel with the oil distribution system of the engine. Accordingly, when the engine rpm is low and the output pressure of oil pump 14 is low, there is no danger that there will be excessive cooling of the oil 12. Only when the engine rpm is high and the oil temperature is high does cooling of the oil 12 in the oil pressure regulation circuit occur. Furthermore, in the present invention the addition of the oil cooler 19 does not bring about a lowering of oil pressure in the main oil distribution circuit and does not result in a need to increase the capacity of the oil pump thereby avoiding increased manufacturing costs.

Referred to FIGS. 3-6, shown therein is a specific embodiment of an oil circulating and cooling system in accordance with the teachings of the present invention.

The oil circulating and cooling unit includes a engine 31 having an oil pan 36 coupled to the bottom of cylinder block 32 with bolts. A gasket 35 is provided between oil pan 36 and cylinder block 32. Cylinder head 34 is attached to the top of cylinder block 32 with bolts and a gasket 33 is provided between cylinder head 34 and cylinder block 32.

Crank shaft 37 is rotatably coupled to the bottom of cylinder block 32. Projection 37A of crank shaft 37 projects from cylinder block 32. Crank timing gear 38 is fixed to projection 37A by means of a key.

Cam shaft 39 is rotatably coupled to cylinder head 34 and drives the intake and exhaust valves (not shown). Cam timing gear 40 is fixed to one end of cam shaft 39 and is above and coplaner with crank timing gear 38. A timing chain 41 runs between cam timing gear 40 and crank timing gear 38. Accordingly, cam timing gear rotates conjugately with the rotation of crank timing gear 38.

In contact with the periphery of timing chain 41 are chain vibration dampers 42 and 43 and chain tensioner 44 which consist, in part, of an oil pressure cylinder. The oil pressure cylinder of adjuster 44 maintains the tension on timing chain 41 at a proper level. Chain vibration dampers 42 and 43, chain tensioner 44 and timing chain 41 are all covered by timing chain cover 45 which is attached to cylinder block 32 by bolts. Furthermore, timing chain cover 45 meets with half arc chain seat 46 positioned somewhat below crank timing gear 38. Water pump 47 is located at the center of chain cover 45 and oil pump 48 is provided at the bottom of cover 45.

Projection 37A of crank shaft 37 also projects into the lower portion of chain cover 45. The outer circumference of projection 37A is covered by oil pump body 49 of oil pump 48. Oil pump body 49 has the form of a flatened cylinder. Furthermore, oil pump body 49 is off set with respect to projection 37A of crank shaft 37 and is attached to chain cover 45 with the usual bolts.

Oil pump 48 comprises a driven gear 50 made up of a gear wheel with inner teeth rotatably inserted into oil pump body 49. Driven gear 50 meshes with off set drive gear 52 which rotates together with crank shaft 37 through an adapter 51 on projection 37A of crank shaft 37. Drive gear 52 and adapter 51 are joined by splines and adapter 51 and projection 37A are joined together by a key 53. A curved spacer 54 is inserted into the space formed by the off set between driven gear 50 and drive gear 52. Accordingly, oil pump 48 is a so called internally driven gear type pump.

Oil pump body 49 has an oil intake port 55 and an oil expulsion port 56 at the point where driven gear 50 and driving gear 52 mesh.

Furthermore, a relief valve 58 is formed in one side of oil pump body 49 with an intervening wall 57 between relief valve 27 and drive gear 52.

The relief valve 58 has a piston chamber 59. Piston chamber 59 is further provided with an oil exhaust hole 61 which opens above chain seat 46 of chain cover 45. Oil intake hole 60 connects piston chamber 59 with oil expulsion port 56 of oil pump body 49. The passage of oil through intake 60 and exhaust hole 61 is determined by the movement of piston 62. Piston 62 is usually forced downward by spring 63 to block holes 60 and 61. When the output pressure of oil pump 48 exceeds a fixed or predetermined value, piston 62 is pushed upward against the force of spring 63 thereby allowing oil to pass through hole 60 and out exhaust hole 61. The top of spring 63 is in contact with end plug 64 connected to the top of piston chamber 59. The chamber formed by the end of plug 64 and the top of piston 62 is provided with a drain port 65.

Projection 37A of crank shaft 37 also projects from oil pump body 49. A pulley 66 is secured with a customary key or keys to the projection 37A. Water pump 47 has a customary structure and circulates cool water within the water jacket of the engine 31. The axial (not shown) of water pump 47 is provided with a pulley 67 which is coupled to pulley 66 via a V belt 68. Pulley 67 is further coupled to a cooling fan 69.

Cam shaft cover 70, covering the head 34 and cam shaft 39, is secured to the top of head 34 with the usual bolts.

In operation, when engine 31 is started, crank shaft 37 is turned. Cam shaft 39 is rotated by means of crank timing gear 38, chain 41 and cam timing gear 40. At the same time oil pump 48 is rotated. Furthermore, water pump 47 together with cooling fan 69 are driven by means of pulley 66, V belt 38 and pulley 67.

As oil pump 48 turns, the oil in oil pan 36 is drawn into the oil intake port 55 and discharged from oil expulsion port 56. The expelled oil is pumped throughout the engine. When engine rmp is high, that is, when the rpm of the crank shaft 37 is high, the discharge pressure of oil pump 48 increases. When this happens, piston 62 of relief valve 58 moves against the pressure of spring 66 thereby opening oil intake oil 60 and oil discharge oil 61 thereby discharging oil from oil discharge hole 61 (see FIG. 6). It is in this manner that the pressure of oil pump 48 is maintained at a substantially constant level.

Figure 7:
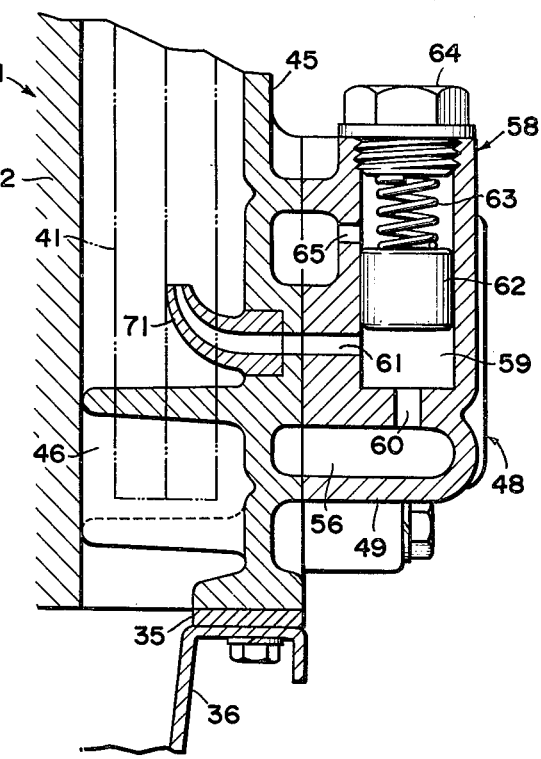
FIG. 7 is another embodiment of the present invention shown in cross section along the lines VII—VII in FIG. 5.

The oil discharged from oil discharge hole 61 flows directly into half arc chain seat 46. After the oil flows into half arc chain seat 46, it is dispersed by the flashing of the rotating timing chain 41 and is carried to the cam timing gear 40 at the top of the cylinder head 34 and thrown by centrifugal force against the inside front of cam shaft cover 70. This dispersed oil flows down the front of cam shaft cover 70, the front surfaces of cylinder head 34 and the front surface of chain cover 45 and returns to oil pan 36. Since cam shaft cover 70, the front surfaces of cylinder head 34 and chain cover 45 are maintained at a relatively low temperature by the action of cooling fan 69, the temperature of the dispersed oil is reduced as it returns to oil pan 36 thereby reducing the total temperature of the oil in oil pan 36. Accordingly, the engine oil is only cooled when the rpm of the engine is high. Referring to FIG. 7, shown therein is a modification to the oil pump of FIG. 5. As shown in FIG. 7, a bent nozzle 71 can be screwed or press-fitted into oil discharge port 61 of relief valve 58. Bent nozzle 71 causes the oil to be sprayed directly upward into the air for cooling purposes and to splash in large amounts onto the timing chain 41. In this way even more cooling is provided for the oil.

This invention has been described in terms of an overhead cam engine, but this invention is not limited to overhead cam engines and is applicable to overhead valve engines and other types of engines where the timing chain drives the cam shaft.

In all cases it is understood that the above described embodiment is merely illustrative of but one of the many possible specific embodiments which can represent applications of the principals in the present invention. Numerous and varied other arrangements can be readily devised in accordance with these principals by those skilled in the art without departing from the spirit and scope of the invention.

I claim:

1. An oil circulating and cooling system for an internal combustion engine of the type having an oil pan and an oil distribution system comprising:
    an oil pump to pump oil under pressure throughout the oil distribution system of said internal combustion engine;
    a valve means coupled to the output of said oil pump for diverting a portion of said oil from said oil pump when the oil pressure from said oil pump is some predetermined value;
    a half arc chain seat for a crank timing gear to hold said diverted oil from said valve means, said half arc seat and said valve means arranged and configured such that said diverted oil is applied directly to the crank timing gear to said half arc seat, and to said timing chain whereby as the timing chain revolves the diverted oil from said valve means is thrown from said timing chain and flows down the cam shaft cover, the cylinder head, and the timing chain cover and returns to the oil pan thereby cooling the oil.

2. An oil circulating and cooling system according to claim 1 wherein at least one of the cam shaft cover, the cylinder head and timing chain cover is formed in a low temperature area of said engine.

3. An oil circulating and cooling system according to claim 2 wherein said low temperature area is formed in the front portion of said engine.

4. An engine oil circulating and cooling system according to claim 3 wherein said oil pump is disposed in the front bottom portion of the engine.

5. An engine oil circulating and cooling system according to claim 4 wherein said valve means comprises a relief valve.

6. An engine oil circulating and cooling system according to claim 5 wherein said relief valve is formed in said oil pump.

7. An engine oil circulating and cooling system according to claim 6 wherein said oil pump is an internally driven gear type pump.

* * * * *